(12) United States Patent
Lobo et al.

(10) Patent No.: US 8,757,872 B2
(45) Date of Patent: Jun. 24, 2014

(54) OPTICAL FLAME SENSOR

(75) Inventors: Julio Danin Lobo, Baden (CH);
Mehmet Mercangoez, Baden-Dättwil (CH); Ken Yves Haffner, Baden (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 13/526,255

(22) Filed: Jun. 18, 2012

(65) Prior Publication Data
US 2012/0304903 A1   Dec. 6, 2012

(51) Int. Cl.
*G01J 5/00* (2006.01)
*F23N 5/00* (2006.01)

(52) U.S. Cl.
USPC .............................. 374/121; 431/76

(58) Field of Classification Search
CPC .................................................. C04B 35/597
USPC ............. 374/121; 706/16, 23; 431/12, 18, 24, 431/75, 76, 176
See application file for complete search history.

(56) References Cited

U.S. PATENT DOCUMENTS

| | | | | |
|---|---|---|---|---|
| 5,672,425 | A * | 9/1997 | Sato et al. | 428/332 |
| 5,971,747 | A * | 10/1999 | Lemelson et al. | 431/12 |
| 6,468,069 | B2 * | 10/2002 | Lemelson et al. | 431/12 |
| 6,780,378 | B2 * | 8/2004 | Abbasi et al. | 422/78 |
| 6,967,304 | B2 * | 11/2005 | Gevelber et al. | 219/121.47 |
| 7,217,121 | B2 * | 5/2007 | Thomson et al. | 431/12 |
| 8,070,482 | B2 * | 12/2011 | Fuentes et al. | 431/76 |
| 2004/0033457 | A1 * | 2/2004 | Zhang et al. | 431/79 |
| 2006/0208260 | A1 * | 9/2006 | Sakuma et al. | 257/76 |
| 2006/0228897 | A1 * | 10/2006 | Timans | 438/758 |
| 2007/0177650 | A1 | 8/2007 | Huston et al. | |
| 2009/0017406 | A1 * | 1/2009 | Farias Fuentes et al. | 431/76 |
| 2009/0299154 | A1 * | 12/2009 | Segman | 600/301 |

FOREIGN PATENT DOCUMENTS

| | | |
|---|---|---|
| DE | 197 10 206 A1 | 9/1998 |
| WO | WO 03/069230 A1 | 8/2003 |

OTHER PUBLICATIONS

C. R. Chou, J. Z. Yim, W. P. Huang, "Determining the hydrographic parameters of the surface of water from the image sequences of a CCD camera", Experiments in Fluids 36 (2004), pp. 515-527.*
Fan Jiang, Shi Liu, Gang Lu, Yong Yan, Haigang Wang, Yanmin Song, Renxiong Ma, Zhonggang Pan, "Experimental Study on Measurement of Flame Temperature Distribution Using the Two-Color Method", J. of Thermal Science vol. 11, No. 4, pp. 377-382.*

(Continued)

*Primary Examiner* — Lisa Caputo
*Assistant Examiner* — Nasir U Ahmed
(74) *Attorney, Agent, or Firm* — Buchanan Ingersoll & Rooney PC

(57) ABSTRACT

Exemplary embodiments relates to an optical measurement that determines the temperature in a flame and determines the particle size of the fuel present in the flame. The optical measurement device includes a color camera that measures light information in the flame and outputs measurement results and an evaluation unit that evaluates the measurement results. Further, a coal burning power plant is provided with a multitude of burners that burn milled coal each in a flame and a multitude of optical measurement devices described.

24 Claims, 6 Drawing Sheets

(56) References Cited

OTHER PUBLICATIONS

Notification of Transmittal of the International Preliminary Report on Patentability, International Preliminary Report on Patentability (IPRP) and Written Opinion of the International Searching Authority, issued by the International Bureau of WIPO in the corresponding International Application No. PCT/EP2009/067246.

International Search Report (PCT/ISA/210) issued on Jul. 8, 2010, by the European Patent Office as the International Searching Authority for International Application No. PCT/EP2009/067246.

Written Opinion (PCT/ISA/237) issued on Jul. 8, 2010, by the European Patent Office as the International Searching Authority for International Application No. PCT/EP2009/067246.

D.F. Kronholm et al., "Analysis of Soot Surface Growth Pathways Using Published Plug-Flow Reactor Data with New Particle Size Distribution Measurements and Published Premixed Flame Data", Proceedings of the Combustion Institute, Jan. 1, 2000, pp. 2555-2561, vol. 28, No. 2.

K.A. Thomson et al., "Laser induced incandescence measurement of soot volume fraction and effective particle size in a laminar co-annular non-premixed methane/air flame at pressure between 0.5-4.0 MPa", Applied Physics, Apr. 8, 2006, pp. 469-475, vol. 83, No. 3.

S.M. Scrivner et al., "Soot particle size distribution measurement in a premixed flame using photon correlation spectroscopy", Applied Optics, Jan. 15, 1986, pp. 291-297, vol. 25, No. 2.

\* cited by examiner

OPTICAL FLAME SENSOR

RELATED APPLICATIONS

This application claims priority as a continuation application under 35 U.S.C. §120 to PCT/EP2009/067246 filed as an International Application on Dec. 16, 2009 designating the U.S., the entire content of which is hereby incorporated by reference in its entirety.

FIELD

The present disclosure generally relates to a measuring device such as a measuring device and a method which optically detects hot spots in a flame.

BACKGROUND

Nitrogen oxide ($NO_x$) such as nitric oxide (NO) or nitrogen dioxide ($NO_2$) can be formed during coal combustion. Nitrogen oxides can have severe health effects. In addition, nitrogen oxides are identified as greenhouse gases. Atmospheric $NO_x$ forms nitric acid which contributes to acid rain. Hence, environmental regulations can call for the reduction of nitrogen oxide formation in combustion reactions in furnaces and boilers and may include even the application of economic fines for emitters.

Nitrogen oxide (briefly $NO_x$ or NOx) is, inter alia, formed in so-called hot spots of flames where the temperature is essentially higher than desired. Optical techniques are applied in order to monitor the combustion process given the fact that the reaction leading to nitrogen oxide formation correlates with high temperature spots in the flame. A direct measurement of the hot spots can thus be utilized as a control parameter to optimize the combustion and thereby reduce the formation of $NO_x$.

Further, the formation of carbon monoxide (CO) in the combustion process is an issue that needs attention as well. Both the formation of NOx and CO depends on several variables, in particular on the temperature, the ratio between fuel and air present in the combustion process and the particle size of the fuel.

In order to determine and control these variables, optical monitoring is used in combustion processes. In the combustion of clear burning fuels such as gas and liquid hydrocarbons, optical standard methods such as spectroscopy allow satisfying results in the determination and localization of hot spots. However, the optical monitoring of coal combustion is not comparably straightforward due to the longer volatilisation time of the solid coal. That is, when burning coal, there are always small particles present in the flame complicating spectroscopy.

A further task in coal burning is to identify particle sizes, because particles deviating from the optimum size will further result in non-optimal combustion processes that can result in hot spots or the like. The variability of the particle sizes has also an impact on the combustion control. Smaller particles burn quicker, larger particles need more time to volatize.

Known processes measure optically the emission from radical species present in the flame such as OH⁻, CH⁻ and $C_2^{-3}$. In combustion of clear burning gases and liquid fuels, monitoring of emission from these radicals in the flame can give an accurate reading of flame temperature and reaction stoichiometry. For coal applications, however, due to the presence of solid particles of varying size, the direct detection of radical species is not comparably feasible. The coal particles scatter the light emanating from the flame thus making the direct measurement of the flame temperature from radicals difficult or even impossible. In addition, stoichiometry involves optical elements such as filters, lenses, mirrors or the like that are expensive and can call for a high degree of maintenance. For instance, in a coal burning power plant which has a large number of burners, providing, setting up and maintaining these optical elements for each burner implies a large investment.

Therefore, there exists a need for an improved optical monitoring method and apparatus capable of determining the temperature, in particular hot spots as well as the particle size of the fuel. In particular, a need exists for an easy to install and comparably cheap optical monitoring method and device so that a multitude of the devices can be installed at several burners.

SUMMARY

An exemplary optical measurement device adapted for determining the temperature in a flame and for determining a particle size of a fuel present in the flame is disclosed, the optical measurement device comprising: a color camera that measures light information in the flame and outputting measurement results; and, an evaluation unit that evaluates the measurement results.

An exemplary method for determining the temperature and particle size of a fuel present in a flame is disclosed, the method comprising: receiving light information from the flame and measuring it by a colour camera; providing the measurement results to an evaluation unit; and evaluating the measurement results.

DRAWINGS

A full and enabling disclosure, including the best mode thereof, to one of ordinary skill in the art is set forth more particularly in the remainder of the specification including reference to the accompanying drawings wherein:

FIGS. 1, 2, 3a, 3b, 7, and 8 illustrate respective embodiments of an optical measurement device in accordance with exemplary embodiments of the present disclosure.

DETAILED DESCRIPTION

Figure 1:
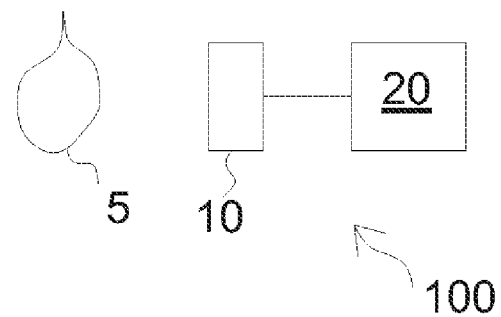

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale but rather serve only for the better understanding of the embodiments.

Exemplary systems and methods disclosed herein allow reducing the formation of nitrogen oxide by monitoring the flame for its temperature and the particle size distribution of fuel particles within the flame. And also allow for the formation of CO to be monitored and controlled. During standard combustion, the particle size can have a constant value. Control of the respective parameters such as the milling settings is oriented thereon. Only during the transition period, i.e. during start-up of the combustion, larger particle sizes might be desired.

In view of the above, according to an exemplary embodiment of the present disclosure, an optical measurement device can be adapted for determining the temperature in a flame and for determining the particle size of the fuel present in the flame and includes a color camera for measuring light information in the flame and outputting measurement results. The device further includes an evaluation unit adapted for evaluating the measurement results.

In the context of the present disclosure, fuel signifies any combustible, including gaseous and/or liquid and/or solid state combustibles, and in particular including coal in any form. For the disclosed device and method to operate efficiently, fuel should include a certain degree of fuel having particles of a certain particle size.

According to another exemplary embodiment of the present disclosure, a coal burning power plant is provided. The coal burning power plant can have a multitude of burners for burning milled coal each in a flame and a multitude of optical measurement devices.

According to an exemplary embodiment disclosed herein, a method for determining the temperature and particle size of the fuel present in a flame is provided. The method includes receiving light information from the flame and measuring it using a colour camera; providing the measurement results to an evaluation unit; and evaluating the measurement results.

According to another exemplary embodiment of the present disclosure, a method for controlling a burner is provided. The methods includes the method for determining the temperature and particle size of the fuel present in a flame as described herein. The method further includes controlling the combustion parameters in dependence on the evaluated measurement results.

Further exemplary embodiments are according to the dependent claims, the description and the accompanying drawings.

In an exemplary embodiment of the present disclosure, the combustion can be controlled through an optimization algorithm, the outcome of which allows a modification of the combustion parameters so as to optimize the combustion temperature, the particle size and/or ratio of added fuel to air. In coal combustion, the method and device, in exemplary embodiments disclosed herein, allows optimizing the combustion process and/or coal particle size.

Figure 11:
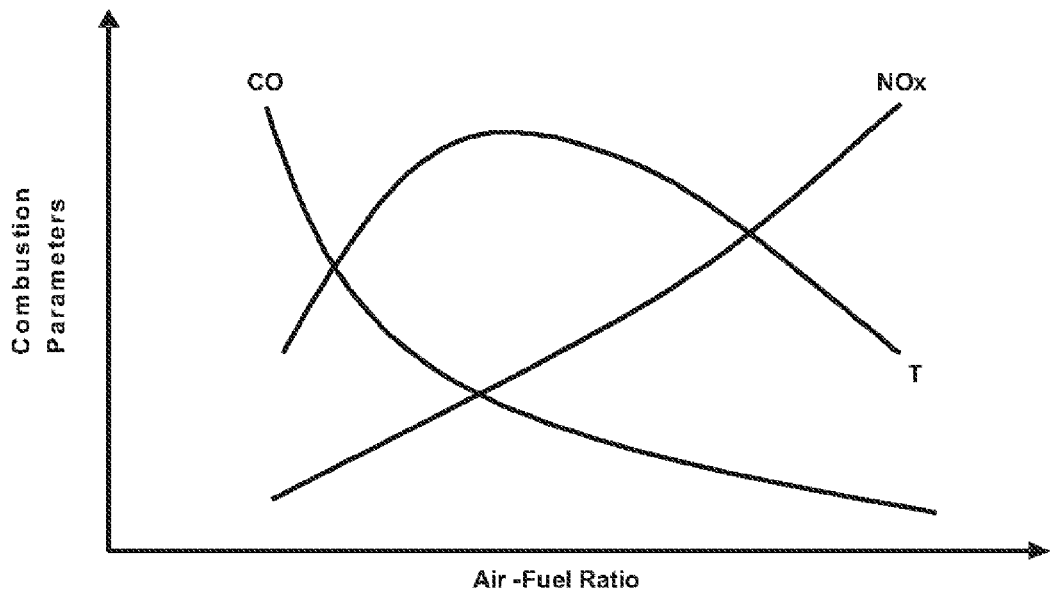
FIG. 11 illustrates the relation between the air to fuel ratio and combustion parameters in accordance with an exemplary embodiment of the present disclosure.

For illustrative purposes, the relationship between the air to fuel ratio, the temperature and the formation of NOx and CO is schematically shown in FIG. 11 as a general trend. The situation at the burner is shown but does not necessarily represent the overall combustion in the furnace:

According to an exemplary embodiment of the present disclosure, the amount of NOx can range from 200 to 1200 ppm, for example. The flame temperature can range, for example, from 1400 to 2400 K. The amount of CO can range from 0 to 10% at the burner. It may further be reduced during overfiring. In the end, between, for example, 50 to 200 ppm of CO is released from the furnace.

Nitric oxide or NO formation in hydrocarbon flames occurs primarily through three mechanisms:

1. thermal NO (the fixation of molecular nitrogen by oxygen atoms produced at high temperatures);

2. fuel NO (the oxidation of nitrogen contained in the fuel during combustion by oxygen in the air); and 3. prompt NO (the attack of a hydrocarbon radical on molecular nitrogen).

In coal combustion, the majority (70% to 90%) of the NO originates from the fuel NO (second case).

Therefore, a step in reducing NOx, which can be key in exemplary embodiments, is to limit the air that is available to react with fuel nitrogen (briefly fuel N). According to exemplary embodiments, a staged combustion is provided. According to the staged combustion, the burners are at the lower end of the furnace and are operated with lower air to fuel ratios or stoichiometries than needed to complete combustion of the coal. As the combustion products rise in the furnace, the amount of air is gradually increased at overfire or secondary overfire stages to complete the combustion process. This arrangement allows the N contained in the fuel to convert to $N_2$ rather than to NO in an $O_2$-poor or $O_2$-reducing environment.

Having a smaller particle size also helps, because the nitrogen atoms (briefly N) contained in the fuel can convert more quickly to $N_2$ before the nitrogen atoms reach the overfire stages.

In an exemplary embodiment according to the present disclosure, the temperature and/or the particle size is measured. A combustion model is used to estimate the effective air to fuel ratio at the burner stage. Knowing this information, both thermal NO can be controlled by keeping the temperature low and, more importantly, fuel NO can be controlled by keeping the air to fuel ratio at its proper value by controlling the air insertion and particle size.

According to other exemplary embodiments disclosed herein, a multitude of at least 6, or at least 12 burners are provided. For instance, having 36 burners and knowing the individual flame scanners/measurements, the individual dampers, which serve to adjust the amount of added air, can be controlled to manipulate the combustion air. Thus, it is possible to maintain the desired conditions at every single burner. This is what is called "individual burner stoichiometry balancing" later on.

According to another exemplary embodiment, also the formation of carbon monoxide is controlled. CO is typically not comparably important as a pollutant since it is possible to control by maintaining an excess of oxygen in the flue gas, i.e. in the overfire zone. However, as illustrated in FIG. 11, efficiency relates to the temperature and the temperature relates to the air to fuel ratio and on how much of the coal is burned at a high temperature (CO represents the degree of incomplete combustion—and burning CO at the overfire air stages is not as efficient since the temperature is lower there).

Therefore there is a trade-off between efficiency and NOx formation. In order to increase the efficiency, more CO most be burned at high temperatures which results in releasing more NOx (see left part of the diagram, before maximum of temperature curve T, of FIG. 11). Increasing the air to fuel ratio, however, the CO conversion cools the flame temperature and then the efficiency drops again (see right part of the diagram of FIG. 11). Generally, the optimal point in the combustion process is off the maximum somewhat to the right in FIG. 11. This ensures normally a more complete combustion. However, if for instance the power plant has to meet specific NOx threshold values, it is also in an embodiment the case that the control is such that an operating temperature is chosen somewhat to the left of a maximum of the temperature curve, which is designated by T.

FIG. 1 illustrates a first optical measurement device in accordance with an exemplary embodiment of the present disclosure. The optical measurement device 100 includes a colour camera 10 for receiving light information from a flame 5. For instance, the colour camera can be a red-green-blue camera as used in standard consumer cameras. Generally, the colour camera can be adapted for outputting information on the visible range from about 400 nm to 800 nm wavelength. The camera 10 can be connected to an evaluation unit 20 that is adapted for determining the temperature in the flame and thus allows determining the nitrogen oxide formation in the flame. Further, the evaluation unit 20 may be adapted for determining the particle size distribution of the fuel present in the flame.

According to an exemplary embodiment, the camera is a three channel RGB (Read-Green-Blue) camera, which includes (e.g., comprises) a CCD or a CMOS sensor chip. It may further be equipped with one or more filters such as a Bayer filter mosaic or the like. For instance, as in the case of the Bayer filter mosaic, various demosaicing algorithms can be used to interpolate a set of complete red, green, and blue values for each point in order to obtain a full-color image. These algorithms can be performed in the camera. In an exemplary embodiment the camera can be a low-cost camera. The exemplary camera allows the separate measurement of red light signals in the red wavelength range, green light signals in the green wavelength range, and blue light signals in the blue wavelength range. In another exemplary embodiment, can be a broad band camera and additional small band filters are used. However, in comparison to the standard or low-cost camera this results in higher costs.

The measurement results are transmitted to an evaluation unit. For instance, the evaluation unit can be a data storage and a microprocessor, e.g. a personal computer. Based on the measured light information, the evaluation unit determines a corresponding temperature. The temperature allows a direct determination regarding the formation rate of nitrogen oxide, because $NO_x$ is formed in hot spots of a flame. It may further allow a determination of the formation of CO. Further, as described in more detail below, it allows a conclusion on the particle size of the fuel within the flame.

The camera allows, according to an exemplary embodiment disclosed herein, a measurement dependent on the position, i.e. with in a spatially resolved manner. For instance, the monitored flame 5 is typically projected onto a two dimensional rectangular plane within the camera 10 with the pixels of the camera 10 being arranged in a matrix configuration. Thereby, when measuring the incident light, it is possible to monitor the temperature and/or pixel size results dependent on the pixel, i.e. on the projected two dimensional position within the flame 5. It is possible to output this result in a map-like manner to an optical screen. An operator of the system can thus monitor optically the temperature and/or particle size distribution over the flame.

In an exemplary embodiment of the present disclosure it is possible to position the camera at a remote location so that the heat of the fire does not damage the camera. It is thus possible to provide a transmitter, such as a fibre optic bundle, for transmitting the light from the burner to the camera. The setup may further include a front-end optics 11 that is adapted to be exposed to the flame 5 and to gather the light emitted from the flame 5 into the transmitter 12, such as the fibre bundle 12.

Figure 2:
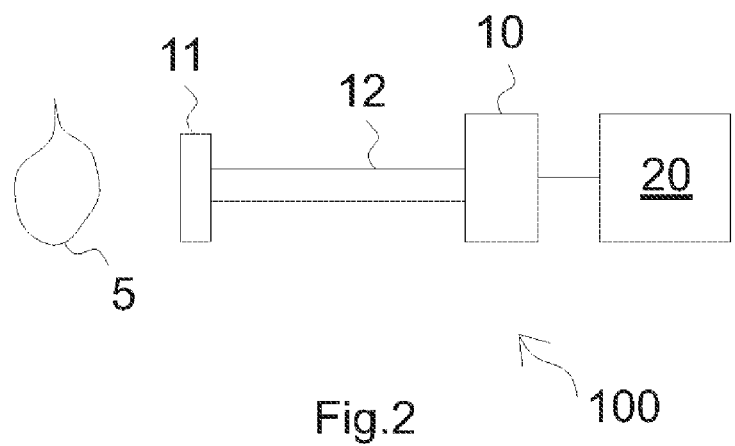

FIG. 2 illustrates a second optical measurement device in accordance with an exemplary embodiment of the present disclosure as shown in FIG. 2 illustrating the flame 5 in the burner, the front-end optics 11 to which the transmitter 12 is connected. In the exemplary embodiment of FIG. 2, the camera 10 is located at one end of the transmitter 12. The camera 10 is connected to the evaluation unit 20.

According to the exemplary embodiments disclosed here, it is possible to provide an amplifier between camera and evaluation unit. It is further generally possible to provide a filter on the front-end optics or between front-end optics and camera so as to let pass only specific wavelengths, such as those within the visible range. Providing specific filter(s) may further allow improving the sensitivity.

It is possible to orientate the light receiving optics in direction of the flame, for instance behind the flame, or sideways to the flame. The term "light receiving optics" as understood herein shall embrace the front-end optics that gathers the radiation emitted from the flame and transmits it to the camera. Thus, the front-end optics can be the camera itself in those applications where the camera is directly positioned facing the flame, or, more likely, it is the front-end optics such as referred to by number 11 in FIGS. 2, 3a and 3b. The light receiving optics 11 has in an embodiment a viewing angle, which is defined between the line of sight from the receiving optics or front-end optics 11 towards the flame 15 and a flame direction, of up to 180°, optionally of up to 90°, optionally of up to 60°, allowing to look at a big portion of the flame 5.

Figure 3A:
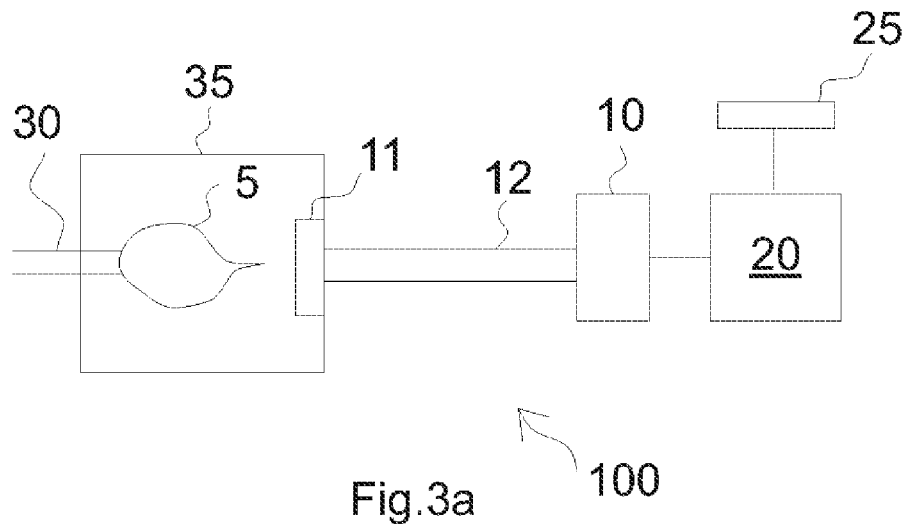
Figure 3B:
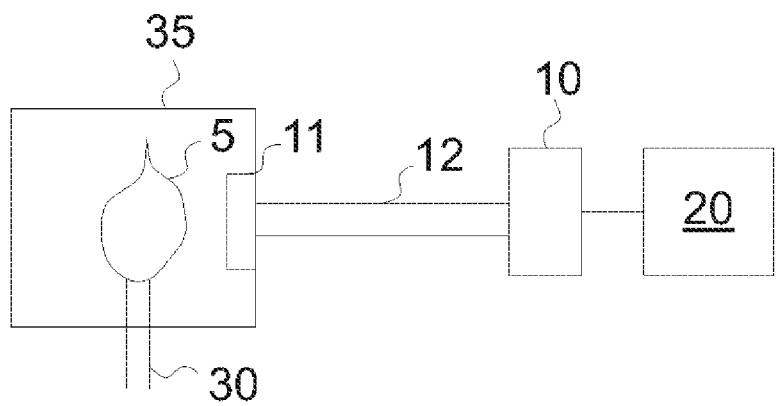

FIGS. 3a and 3b illustrate a third and fourth optical measurement devices, respectively, in accordance with an exemplary embodiment of the present disclosure. A configuration wherein the front-end optics is positioned in front of the flame is schematically shown in FIG. 3a. A lateral setup is schematically shown in FIG. 3b. As stated, it is also possible to position the light receiving optics behind the flame (not shown in the figures).

In FIGS. 3a and 3b reference, number 35 refers to the combustion chamber. The term "combustion chamber" and "burner" shall be used synonymously herein. A feeding tube 30 is typically provided that blows the milled coal along with oxygen or air into the burner 35.

In FIG. 3a a screen 25 is shown for outputting the measurement results of the evaluation unit 10. This screen can be provided in all embodiments described herein. Generally, the measurement results of each pixel of the colour camera result in a two-dimensional projection of the temperature and the particle size within the flame. This can be outputted to the screen in a map-like manner wherein, for instance, the temperature is indicated by colours, e.g. red colour for cold temperature up to the blue colour for hot temperatures. The plot for the particle size can be visualized analogously.

In particular in coal combustion, due to the scattering of light by suspended coal particles, many of the standard frequency resolved optical methods fail as set forth previously. According to the present disclosure, an exemplary method is provided to process the background scatter light and identify the temperature. The method bases the temperature estimation on the assumption of a modified black body radiation spectrum.

The black body radiation is the electromagnetic radiation emitted from the surface of an object due to the object's temperature for the case that the black body is in thermodynamic equilibrium. According to Planck's law of radiation, the emitted wavelength of the black body thermal radiation is described by a probability/intensity distribution that depends only on the temperature.

Figure 4:
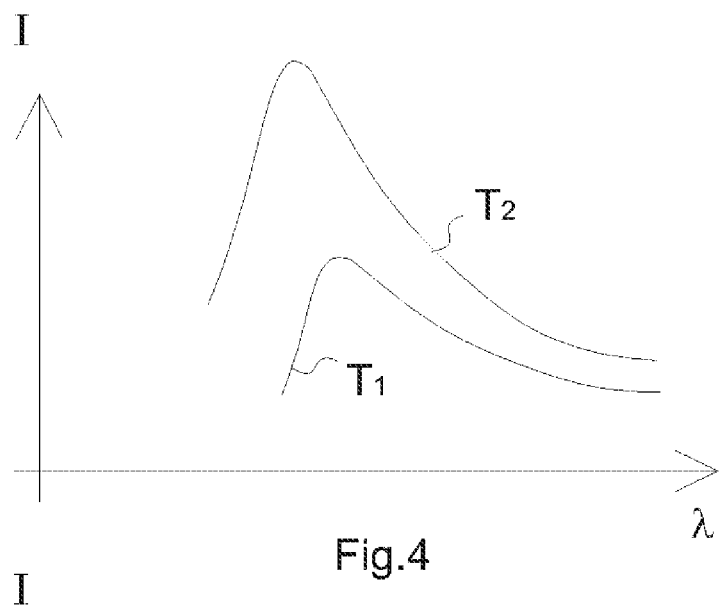
FIG. 4 is a schematic diagram showing the theoretical black body radiation spectrum in accordance with an exemplary embodiment of the present disclosure.

FIG. 4 is a schematic diagram showing the theoretical black body radiation spectrum in accordance with an exemplary embodiment of the present disclosure. For illustration, FIG. 4 shows schematically the black body radiation of two objects, one of them being at an arbitrary temperature of $T_1$, the other one being at an arbitrary temperature of $T_2$ with $T_2>T_1$. The intensity I in dependence of the wavelength $\lambda$ is schematically shown.

According to exemplary embodiments of the present disclosure, the Planck black body emission spectrum is combined with the Mie scattering theory. Mie theory refers to Maxwell equation solutions for electromagnetic radiation when particles have physical size of the order of the wavelength of the radiation. Considering the particle size distribution according to the Mie scattering theory results in an amended shape of the black body spectrum according to Planck.

Theoretically, the Planck spectrum $I_{Planck}$ is modified by the so-called emissivity $\epsilon$ according to $I_{Mie}=\epsilon(\lambda)*I_{Planck}$. Generally, the emissivity $\epsilon$ is assumed according to the widely used empirical equation derived by Hottel and Broughton:

$$\epsilon(\lambda)=1-\exp(-KL/\lambda^\alpha) \qquad (G1)$$

where K is the absorption coefficient ($m^{-1}$), L is the geometrical thickness of the flame along the optical axis (length of the optical path), and $\alpha$ is an empirical parameter (Mie scattering) generally depending on the wavelength $\lambda$ (μm). In an embodiment, $\alpha$ can be considered to be about 1.4 for a steady luminous flame.

Figure 5:
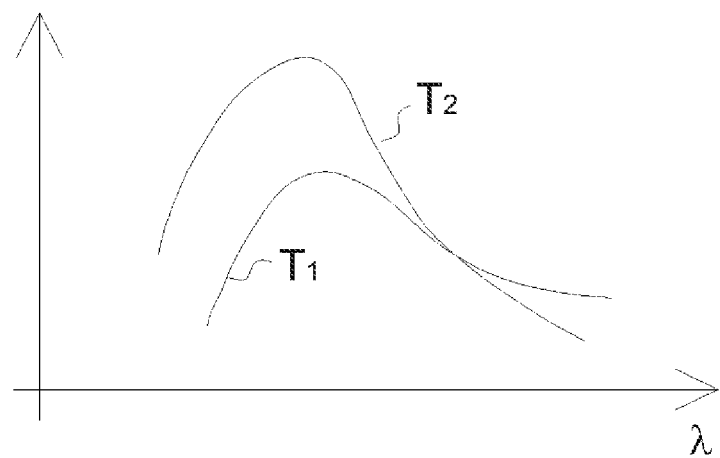
FIG. 5 is a schematic diagram showing a exemplary black body radiation spectrum modified by the Mie scattering theory in accordance with an exemplary embodiment of the present disclosure.

FIG. 5 is a schematic diagram showing a exemplary black body radiation spectrum modified by the Mie scattering theory in accordance with an exemplary embodiment of the present disclosure. As shown in FIG. 5 where the spectrum in terms of the intensity I is plotted in dependence of the wavelength $\lambda$ for the two temperatures $T_1$ and $T_2$ mentioned previously. The terms "modified black body spectrum", "modified Planck spectrum" or the like as used herein shall be understood as "modified with Mie scattering theory", i.e. by considering the emissivity.

According to an exemplary embodiment of the present disclosure, the flame is monitored by means of the colour camera. For instance, the colour camera is a Red-Green-Blue camera so that each of these three colours is measured independently from each other.

Figure 6:
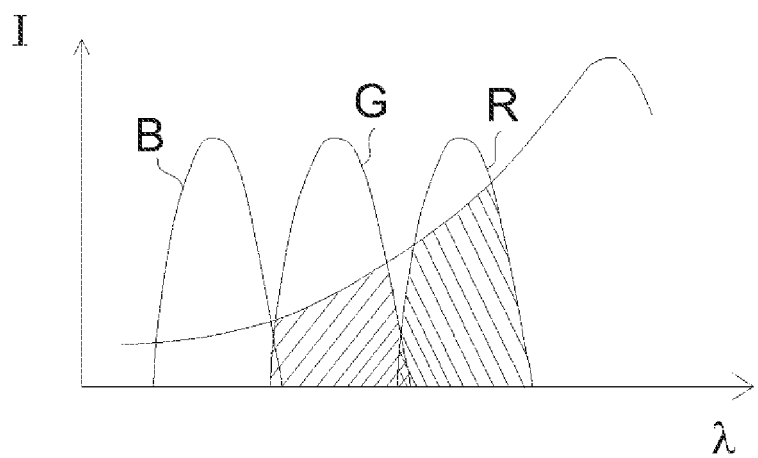
FIG. 6 illustrates exemplary measurement results fitted to the modified black body radiation spectrum in accordance with an exemplary embodiment of the present disclosure.

Generally, the measured intensity of two colours of the camera may be sufficient to find out the corresponding modified black body rotation spectrum. FIG. 6 illustrates exemplary measurement results fitted to the modified black body radiation spectrum in accordance with an exemplary embodiment of the present disclosure. The measurement range as provided by the colour camera is shown: blue (B), green (G) and red (R). Presently, for illustration, we assume that the red channel of the camera has measured a distribution that corresponds to the hatched region in FIG. 6. Similarly, although only illustrated for the green channel, the green and blue channel may have measured a spectrum that fits the shown modified black body spectrum, as well. Hence, it is possible to deduce the corresponding black body spectrum from the measured values and thus the temperature and the particle size of the monitored spot.

According to other exemplary embodiments, the fitting is performed by a fitting method using at least two measurement results, i.e. the results from any two out of the three colours. Nonetheless, the result can be improved, if the measured values of all three colours are taken into account so that the respective spectrum can be assigned much more precisely. In order to do so, in an embodiment a first pair of colours is used for the fitting method first. Then, in a second step for improving the fitting result, a second pair of colours is used, wherein the second pair of colours differs from the first pair in one colour.

Given the fact that the emissivity differs only slightly for neighbouring colours (i.e. blue and green; green and red), typically not more than 10%, it is possible that the measurement result of red and green as well as blue and green are used for the determination of the corresponding spectrum. Knowing the respective spectrum distribution allows determination of the temperature of the corresponding spots in the flame.

The Mie scattering correction values KL are determined in the method as well. Notably, whereas KL is composited of two parameters in theory, presently, only the product of the absorption coefficient K and the geometrical thickness of the flame along the optical axis L is determined as measure for the scattering and thus particle size distribution.

In other words, the method described herein allows to separately determine the particle size distribution and the temperature in the flame. In order to do so, the results from the colour camera are used in an algorithm in order to determine the black body radiation spectrum modified by the Mie scattering KL that matches the measurement results. The black body radiation spectrum modified by Mie scattering theory is a unique distribution for each temperature T and each Mie scattering correction value KL. It is therefore theoretically possible to determine the respective temperature and Mie scattering correction value based on two measured values from the three colours of the camera.

However, the method is essentially improved in precision, if all three values are taken into account. Thereby, it is possible to calculate the ratio of the measured intensity of the blue colour and the measured intensity of the green colour. In addition, it is possible to calculate the ratio of the measured intensity of the red colour and the measured intensity of the green colour.

By the exemplary methods disclosed herein, the temperature in the flame and the particle size distribution as projected to the two-dimensional camera surface is measured for each pixel separately. As a result, a map of the temperature and particle size distribution can be calculated for each moment in time. This allows not only the determination of the presence of hot spots but also their localizations. In addition, the method according to the described embodiments allows the determination of a particle size distribution according to the Mie scattering theory. The combined information on the existence of hot spots and the particle size distribution allow to optimize the combustion process, for instance, in the corresponding control of the pre-processing parameters, such as the milling process or in the coal powder and/or air supplying process. Further, the output of the evaluation unit may directly or indirectly be used for the control of a damper that may be provided for controlling the supplied air. According to an exemplary embodiment, a damper is provided for each burner so that the combustion process can be controlled separately for each burner.

By the continued optimization of the combustion process several positive effects are achieved. The rate of nitrogen oxide formation and emission can substantially be reduced; the rate of generated CO can be optimized; the milling size of the coal can be optimized; the fuel to air ratio can be optimized; the efficiency of the process can be improved; etc.

In more detail, the following exemplary method steps can be performed: First, the temperature of each pixel is estimated according to the intensity results $I_{\lambda,1}$ and $I_{\lambda,2}$ at the two wavelengths $\lambda 1$ and $\lambda 2$, whereas either $\lambda 1$ belongs to the red colour and $\lambda 2$ to the green colour, or $\lambda 1$ belongs to the green colour and $\lambda 2$ to the blue colour.

$$T = \frac{c_2\left(\frac{1}{\lambda_2} - \frac{1}{\lambda_1}\right)}{\ln\frac{I_{1\lambda_1}}{I_{2\lambda_2}} + \ln\frac{S_{\lambda_2}}{S_{\lambda_1}} + \ln\left(\frac{\lambda_1}{\lambda_2}\right)^5} \quad (G2)$$

The constant $c_2$ corresponds to the Wien constant. The ln $(S_{\lambda,2}/S_{\lambda,1})$ is a constant, wherein $S_{\lambda,1}$, $S_{\lambda,2}$ are emissivities as a function of wavelengths. This constant may briefly be named s and can be assumed to be equal 1, i.e. s=ln $(S_{\lambda,2}/S_{\lambda,1})$, and in particular s=1. Thus, the temperature can be determined. Given this temperature, the emissivity $\epsilon_1$ and $\epsilon_2$ can be calculated given the dependence $$I_n = C\varepsilon_n \frac{c_1}{\lambda_n^5 e^{\frac{-c_2}{T\lambda_n}}}, n = 1, 2 \quad (G3)$$

with $c_1$ being a proportionality constant. Once knowing the emissivity ($\epsilon_1$ and $\epsilon_2$), the absorption factor KL can be determined by calculating the ratio $I_1/I_2$. KL is strongly related to the number of unburned particles. Hence, the combustion optimization aims at keeping KL as small as possible.

In an exemplary embodiment, this calculation can be done for a first pair of neighbouring colours (i.e. red and green, or green and blue). Further, this calculation may additionally be done for the remaining pair of neighbouring colours. The result of both calculations could be used for calculating a weighted average, possibly taking into account coefficients from calibrations. It is alternatively possible to use both results to do, e.g., a least-square estimation in order to improve the results on the emissivity coefficients $\epsilon_1$ and $\epsilon_2$.

Hence, the present exemplary method allows measuring the light scattering parameters. It further uses a correction method for obtaining a two-dimensional temperature estimate of the flame. Roughly spoken, the method is based on overlapping the three colours of the camera with the flame emission to reconstruct a modified black body radiation curve of the flame. According to embodiments, the algorithm calculates an average particle size distribution which is based on variation that naturally occurs in the fuel. The advantage over standard broad band pyrometers is the use of a third colour to obtain a better temperature estimation in the direct treatment of the scattering. According to some embodiments, additional optical filtering can be performed to improve sensitivity of the measurement.

According to further embodiments, a laser is additionally provided. The laser source is directed at the flame. The laser light scattering is used to measure the particle size and the particle size distribution.

Figure 7:
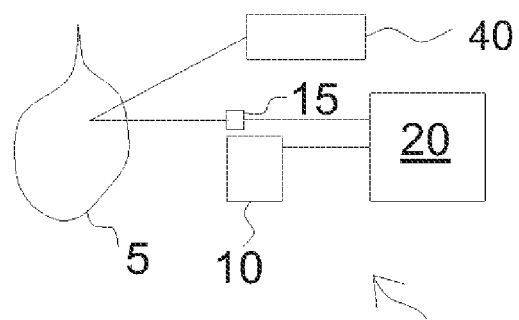

FIG. 7 illustrates a fifth optical measurement device in accordance with an exemplary embodiment of the present disclosure. FIG. 7 schematically shows the principle setup with a laser wherein the laser 40 is directed towards the flame 5 where the laser light is scattered. The laser light can generally be registered by the camera 10. In the embodiments illustrated in FIG. 7, the laser light is detected in the additional detector 15. The measurement results can be transmitted to the evaluation unit 20.

Figure 8:
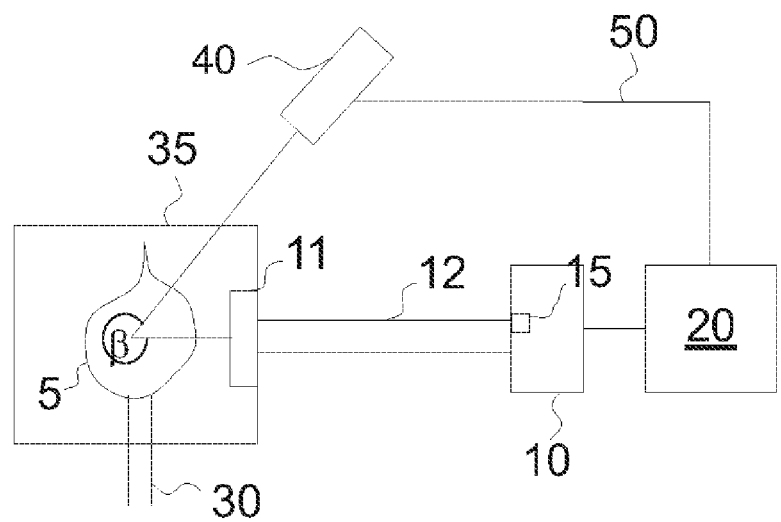

FIG. 8 shows a sixth optical measurement device in accordance with an exemplary embodiment of the present disclosure. The laser light is directed into the combustion chamber 35. An opening or a glass window may be provided in the combustion chamber walls to transmit the laser light. Generally, and not limited to this embodiment, the colour camera 10 and/or the additional detector 15 may be linked to the evaluation unit 20. In FIG. 8 an exemplary link 50 between the laser 40 and the evaluation unit 20 is illustrated. Due to the link between camera 10, detector 15 and/or evaluation unit 20, a data connection between camera 10, detector 15 and/or laser 40 can be provided.

The laser light is scattered by the particles in the flame so that some of the scattered photons can be measured in the camera and/or the detector. To avoid or reduce the influence of the background flame light, it is generally possible to modulate the laser at a specific wavelength and detecting the laser light by the detector 15, e.g. by performing lock-in detection.

The intensity of the scattered laser light at a chosen angle $\beta$ allows determination of the particle size distribution due to the known relation between scattering angle distribution and particle size distribution. Thereby, $\beta$ is chosen in view of the fact that the scattering intensity is proportional to sin $\beta/2$. In an embodiment, the angle $\beta$ can be varied so that the measurement results at different angles can be evaluated. In general, smaller particles result in a smaller intensity, whereas the presence of larger particles increases the scattering.

According to an exemplary embodiment of the present disclosure, the output of the camera is inputted into the evaluation unit in which a control-optimization-software is run which interprets the flame condition and the particle size. Thresholds can be set to maximum parameters, i.e. to reduce nitrogen oxide formation, by triggering the control response necessary to limit the flame temperature or to improve coal pulverization in the preceding mill when large particles are observed. Generally, particle sizes in the range of up to about 200 microns are possible. In an exemplary embodiment, an amount of at least approximately 70% of the particles with sizes smaller than about 75 microns, for example, and more preferably, smaller than 74 microns, allow an efficient burning process with only little nitrogen oxide formation.

Figure 9:
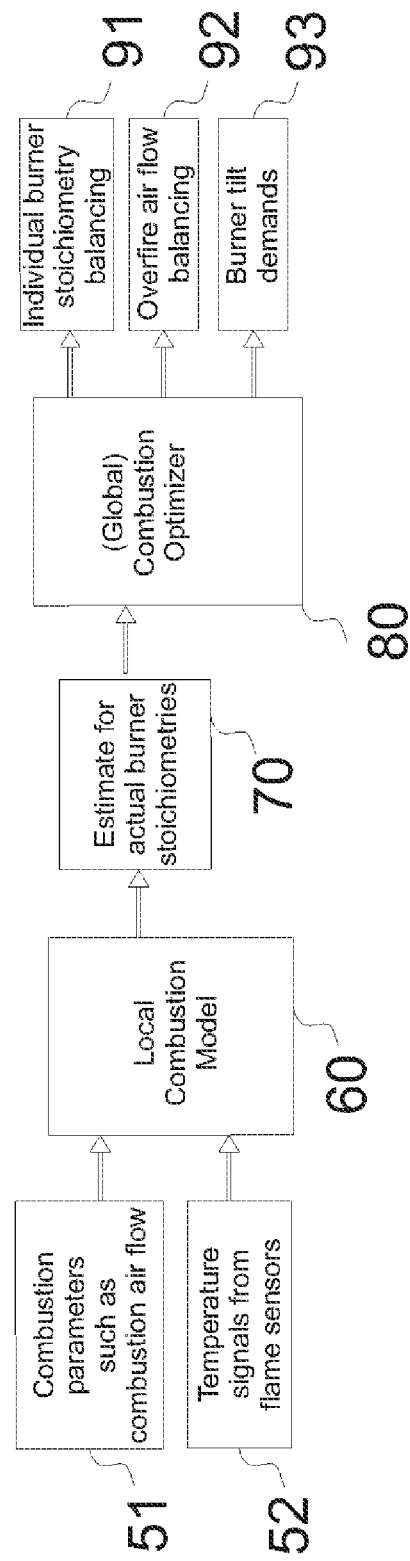
FIGS. 9 and 10 illustrate a control and optimization diagram in accordance with an exemplary embodiment of the present disclosure.
Figure 10:
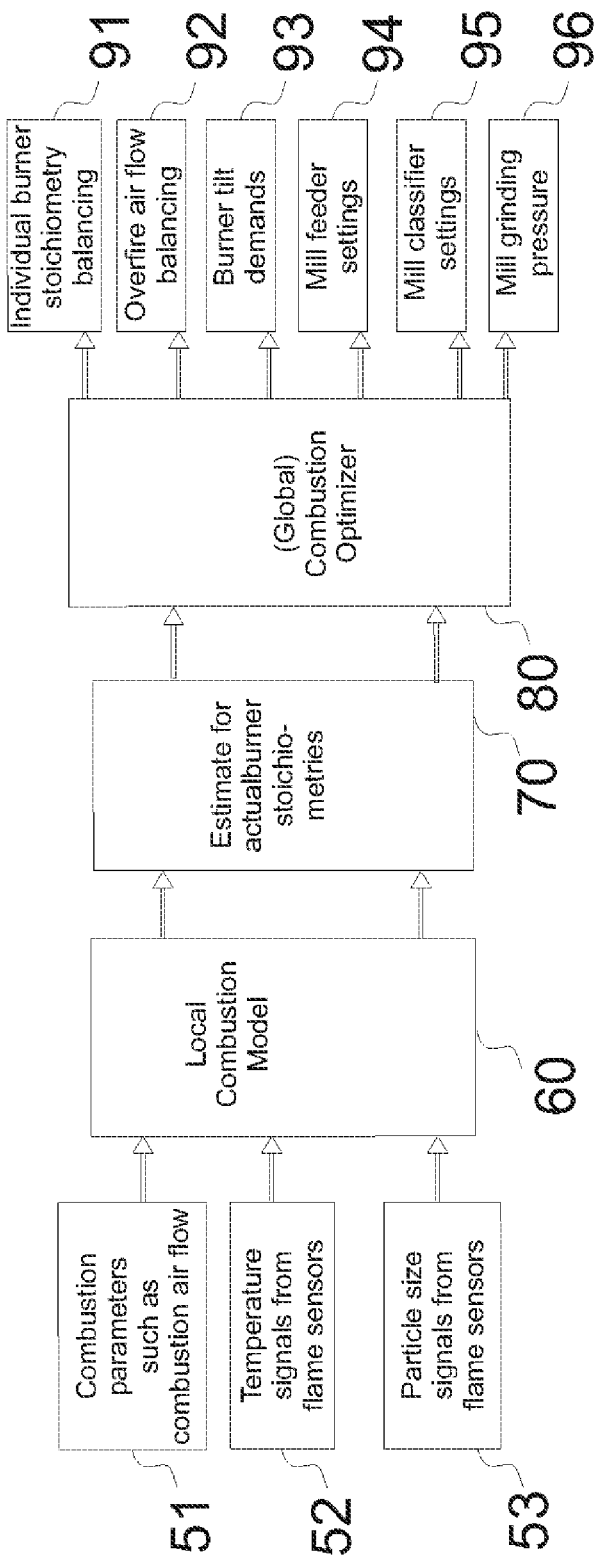

FIGS. 9 and 10 illustrate a control and optimization diagram in accordance with an exemplary embodiment of the present disclosure. As shown in FIG. 9, combustion parameters 51, such as combustion air flow as well as the calculated temperature signals 52 stemming from the measured flame light distribution, are evaluated according to a local combustion model 60. The combustion parameters may include air flow measurements of the air flow to the burner zone (primary and secondary air) and/or a measurement or an estimate for the chemical composition of the pulverized fuel. The local combustion model 60 can be calculated in the evaluation unit 20 shown in FIGS. 1, 2, 3a, 3b, 7, and 8.

Based on the temperature signal and the combustion parameters it is possible to model estimates 70 for the actual burner stoichiometries. The calculation is based on the local combustion model 60 which is a model of the local combustion reactions and the heat and mass transport phenomena. The further stoichiometries obtained from the local combustion model can be fed to a combustion optimizer 80 that is capable of balancing the individual burner stoichiometry 91, i.e. adjusting combustion parameters such as the air flow into the burner, overfire air flows 92 or burner tilts 93 to maximize the efficiency or load while maintaining pollutant levels such as nitrogen oxide or carbon monoxide below their allowed limits.

According to exemplary embodiments, the particle size distribution of the pulverized fuel can be evaluated as described herein. Referring to the diagram of FIG. 10, the particle size signal 53 is evaluated according to the combustion model 60 in the evaluation unit 10. The outcome is an estimate for the actual burner stoichiometry 70 that is fed to the combustion optimizer 80. The combustion optimizer can utilize this information to additionally control pre-processing parameters such as the coal mill operating parameters, e.g. the mill feeder settings 94, the mill classifier settings 95, or the mill grinding pressure 96 in order to maintain the average particle size at a desired value or to bring the average particle size to this desired value.

The term "global" in FIGS. 9 and 10 is shown in brackets. According to some exemplary embodiments, the combustion optimizer is a global combustion optimizer so that the optimizer has global information about the status of several mills and several burners, possibly of all mills and burners that are to be monitored and controlled such as all the mills and burners employed in a coal burning power plant.

Hence, it is possible to rearrange the loading of different mills and burners in order to reach the optimization goals for a given load provided the combustion optimizer has sufficient information about the status of the mills and burners.

However, it is also possible to provide an individual combustion optimizer. For instance, when the flame sensors are paired with a burner whose secondary air flow can be individually corrected, such as by means of a damper arrangement, an alternative embodiment would be to set up an individual burner stoichiometry controller without the need to use the global combustion optimizer. For instance, in such an embodiment the secondary air flow to the specific burner can be adjusted according to the feedback from the burner stoichiometry estimates which, in turn, are deduced from the evaluation of the measured light information.

In exemplary embodiments, the control action can be determined based on the temperature signals from the flame sensor by a proportional-integral controller (PI controller) or a proportional-integral-derivative controller (PID controller) where the controller gain can be selected according to a simplified linear relationship between the burner zone temperature signal and the stoichiometry.

In addition, it is further possible to add reducing agents to the combustion chamber. The formation of nitrogen oxide in coal combustion can be reduced when the volatilization occurs under reducing conditions. Given the exemplary monitoring method according to the present disclosure, it is possible to control the addition of reducing agents in dependence on a measured situation, i.e. in dependence on whether hot spots are present which will result in an unacceptable degree of nitrogen oxide formation.

The flame monitoring system and method as described herein can generally be utilized for sensing the flame on/off status, and/or for combustion optimization, and/or for spatial monitoring of the flame. It is desirable to have a low-cost, direct, fast, and suitable optical technique that can measure the flame temperature and particle size, and/or that can be used together with a control algorithm to adjust the combustion parameters, in particular to limit the formation of nitrogen oxide. The method and apparatus as described herein allow to control $NO_x$ formation and the efficiency of burning coal in a combustion process. The use of a standard colour camera, such as a RGB camera, allows to provide such a monitoring system at very low costs. Further, given that there is no spectroscopy necessary, the provision of further optical devices such as filters, mirrors, lenses and the like is dispensable. Thereby, the overall effort is massively reduced.

It may be that the use of low-cost camera and the assumption of the black body radiation or a modified black body radiation might be a less precise technique in comparison to other techniques based on radial spectroscopy for making temperature and stoichiometry measurements. However, these techniques are mainly helpful for gas and liquid fuel burning where the existence of particles in the flame is negligible. In particular, for coal combustion the resolution obtainable with the method and device as described herein is generally sufficient to improve the combustion optimization and to reduce the formation of nitrogen oxide.

The exemplary method disclosed herein is sufficiently precise even without the use of a laser but including fitting the measured light distribution to the modified black body radiation in order to obtain the temperature, the emissivity and the absorption factor. A fast microprocessor allowing an online monitoring is provided in an exemplary embodiment. However, the particle size estimation algorithm based on passive monitoring will in many embodiments not be as precise as a laser-based scattering technique wherein a laser is additionally provided, as described above. By additionally using a laser, that can possibly be modulated in cooperation with an additional detector and/or the camera, the measurement precision can further be improved.

According to exemplary embodiments of the present disclosure, the proposed flame determining device is used in addition to existing flame scanners.

According to other exemplary embodiments of the present disclosure, two optical measurement devices per combustion chamber may be provided. For instance, one measurement device may be oriented sideways to the flame, whereas the other measurement device may be positioned behind or in front of the flame.

Generally, it is possible to provide a multitude of burners each provided with an optical measurement device as described herein. For instance, a coal burning power plant 200 can be provided with at least 24 burners and at least 24 optical measurement devices, more possibly at least 36 burners and at least 36 optical measurement devices. The set-up costs are reduced in comparison to prior art techniques involving complicated set-ups with filters and the like. Furthermore, given the possible evaluation of both a blue-green measurement comparison and a green-red measurement comparison, the measurement results are sufficiently precise for efficiently and ecologically operating the burners.

Figure 12:
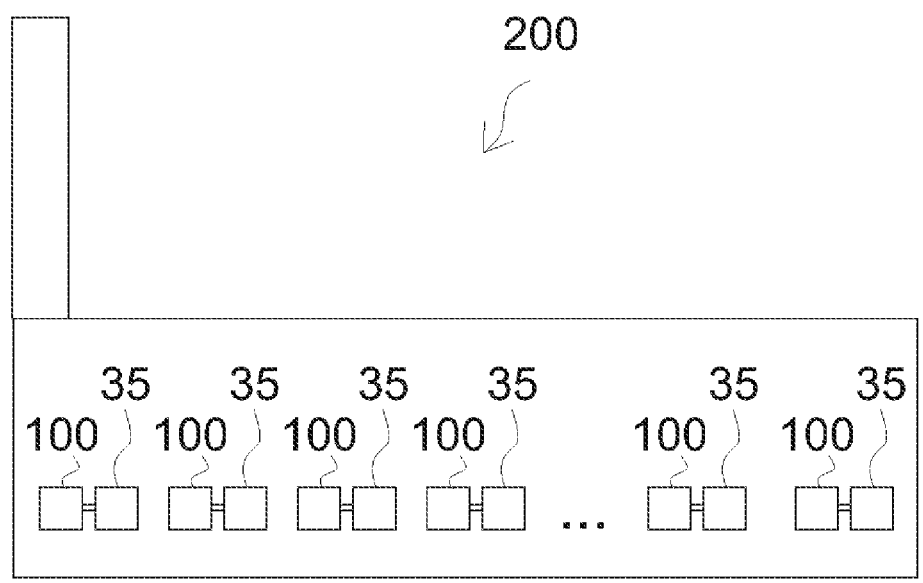
FIG. 12 illustrates a coal burning power plant in accordance with an exemplary embodiment of the present disclosure.

FIG. 12 illustrates a coal burning power plant in accordance with an exemplary embodiment of the present disclosure. As shown in FIG. 12, the coal burning power plant 200 includes a multitude of burners 35. Each burner 35 is monitored by an optical measurement device 100.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMERALS 5 flame
10 three channel camera
11 frontend optics
12 transmitter
15 detector
20 evaluation unit
25 screen
30 feeding tube
35 burner
40 laser
50 link to the laser
51, 52, 52, 60, 70, 80, 91, 92, 93, 94, 95, 96 method elements in FIGS. 9, 10.
100 optical measurement device
200 coal combustion power plant
T, $T_1$, $T_2$ temperatures
I intensity
$\lambda$ wavelength
$\beta$ angle between laser light and line of sight
B, G, R blue, green, red
CO carbon monoxide
NOx nitrogen oxides

| REFERENCE NUMERALS | |
| --- | --- |
| 5 | flame |
| 10 | three channel camera |
| 11 | frontend optics |
| 12 | transmitter |
| 15 | detector |
| 20 | evaluation unit |
| 25 | screen |
| 30 | feeding tube |
| 35 | burner |
| 40 | laser |
| 50 | link to the laser |
| 51, 52, 52, 60, 70, 80, 91, 92, 93, 94, 95, 96 | method elements in FIG. 9, 10. |
| 100 | optical measurement device |
| 200 | coal combustion power plant |
| T, $T_1$, $T_2$ | temperatures |
| I | intensity |
| $\lambda$ | wavelength |
| $\beta$ | angle between laser light and line of sight |
| B, G, R | blue, green, red |
| CO | carbon monoxide |
| NOx | nitrogen oxides |

The invention claimed is:

1. An optical measurement device comprising:
   a color camera that measures light information in a flame and outputs measurement results; and,
   an evaluation unit configured to evaluate the measurement results by determining:
      a temperature in the flame based on the measured light information to detect hot spots having a temperature that is substantially higher than a specified temperature; and
      a particle size distribution of a fuel present in the flame, wherein a black body radiation spectrum $I_{Planck}$ is modified by Mie scattering theory according to $I_{Mie}=\epsilon(\lambda)*I_{Planck}$, with $\epsilon(\lambda)$ being the emissivity for a specific wavelength, so that the modified black body radiation spectrum matches the measurement results and includes a unique distribution for each temperature and each Mie scattering correction value, with the Mie scattering correction value being a measure for the particle size distribution.

2. The optical measurement device according to claim 1 wherein the evaluation unit determines a nitrogen oxide and/or carbon monoxide concentration.

3. The optical measurement device according to claim 1, wherein the optical measurement device is positioned and aligned to have one of an angle of view of or up to 180°, up to 90°, or up to 60°, with respect to a flame direction.

4. The optical measurement device according to claim 3, further comprising:
   a detector that measures the light scattered by the laser within the flame, the laser light being optionally modulated and detected by the detector using a lock-in technique.

5. The optical measurement device according to claim 1, further comprising:
   a laser that directs laser light towards the flame.

6. The optical measurement device according to claim 1, further comprising:
   a screen that optically outputs the measurement results in a spatially resolved manner or in a two-dimensional map.

7. A coal burning plurality power plant comprising:
   a multitude of burners that burn milled coal each in a flame; and
   a plurality of optical measurement devices according to claim 1 wherein a number of burners is equal to a number of optical measurement devices.

8. The optical measurement device of claim 1, wherein the camera is a Red-Green-Blue camera, and the evaluation unit is configured to measure each of the three colours independently and to determine a corresponding modified black body radiation spectrum from a measured intensity spectrum of at least two of the three colours.

9. The optical measurement device of claim 8, wherein the evaluation unit is configured to:
   estimate a temperature of each camera pixel according to two intensity results at respective two wavelengths, with the two wavelengths either belonging to the red colour and the green colour, or to the green colour and the blue colour;
   calculate an emissivity for each of the two wavelengths given the temperature estimate; and
   determine the Mie scattering absorption factor based on the emissivity by calculating the ratio of the two intensity results.

10. A method for measuring comprising:
    receiving light information from a flame and measuring it by a colour camera;
    providing the measurement results to an evaluation unit; and evaluating, in the evaluation unit, the measurement results by determining:
a temperature in the flame based on the measured light information for detecting hot spots having a temperature that is substantially higher than a specified temperature; and
a particle size distribution of a fuel present in the flame, wherein a black body radiation spectrum $I_{Planck}$ is modified by Mie scattering theory according to $I_{Mie}=\epsilon(\lambda)*I_{Planck}$, with $\epsilon(\lambda)$ being the emissivity for a specific wavelength, so that the modified black body radiation spectrum matches the measurement results and includes a unique distribution for each temperature and each Mie scattering correction value, with the Mie scattering correction value being a measure for the particle size distribution.

11. The method according to claim 10, further comprising: providing further information on combustion parameters to the evaluation unit.

12. The method according to claim 10, further comprising: determining one or more of a formation of nitrogen oxides in the flame, a formation of carbon monoxide in the flame, and an emissivity of the flame.

13. The method according to claim 10, further comprising directing laser light at the flame.

14. The method according to claim 13, further comprising:
providing a detector and optionally modulating the laser light and detecting the laser light by the detector, using a lock-in technique.

15. A method for controlling a burner comprising:
detecting hot spots and particle size of a fuel present in a flame according to claim 10, and
controlling combustion parameters in dependence on the evaluated measurement results.

16. The method according to claim 10, wherein the camera allows measurement in a spatially resolved manner, wherein the measurement results of each pixel of the camera generate a two-dimensional projection of the temperature and the particle size within the flame, and wherein a map of the temperature and particle size distribution is calculated for each moment in time, and includes a determination and localization of hotspots.

17. The method according to claim 16, further comprising:
providing further information on combustion parameters to the evaluation unit.

18. The method according to claim 16, further comprising:
determining one or more of a formation of nitrogen oxides in the flame, a formation of carbon monoxide in the flame, and an emissivity of the flame.

19. The method according to claim 10, wherein the camera is a Red-Green-Blue camera and each of the three colors is measured independently, and wherein a corresponding modified black body radiation spectrum is determined from a measured intensity spectrum of at least two of the three colors.

20. The method according to claim 19, further comprising:
providing further information on combustion parameters to the evaluation unit.

21. The method according to claim 19, further comprising:
determining one or more of a formation of nitrogen oxides in the flame, a formation of carbon monoxide in the flame, and an emissivity of the flame.

22. The method according to claim 19, wherein a first pair of colors is used first and then results associated with the first pair colors are improved by using a second pair of colours, wherein the second pair of colours differs from the first pair in one colour.

23. The method according to claim 22, further comprising:
determining one or more of a formation of nitrogen oxides in the flame, a formation of carbon monoxide in the flame, and an emissivity of the flame.

24. The method according to claim 22, comprising:
estimating a temperature of each camera pixel according to two intensity results at respective two wavelengths, with the two wavelengths either belonging to the red colour and the green colour, or to the green colour and the blue colour;
calculating an emissivity for each of the two wavelengths given the temperature estimates; and
determining the Mie scattering absorption factor based on the emissivity calculation by calculating a ratio of the two intensity results.

* * * * *